United States Patent [19]

Scott

[11] Patent Number: 5,926,781
[45] Date of Patent: Jul. 20, 1999

[54] ROUNDNESS MEASURING

[75] Inventor: Paul James Scott, Leicester, United Kingdom

[73] Assignee: Taylor Hobson Limited, United Kingdom

[21] Appl. No.: 08/817,491

[22] PCT Filed: Oct. 18, 1995

[86] PCT No.: PCT/GB95/02460

§ 371 Date: May 28, 1997

§ 102(e) Date: May 28, 1997

[87] PCT Pub. No.: WO96/12162

PCT Pub. Date: Apr. 25, 1996

[30] Foreign Application Priority Data

Oct. 18, 1994 [GB] United Kingdom .................. 9421013

[51] Int. Cl.⁶ ............................... G01B 5/28; G01B 7/03
[52] U.S. Cl. .......................... 702/151; 702/150; 702/167; 702/168; 702/169; 33/503; 33/504; 33/505; 33/554; 33/589; 33/644
[58] Field of Search .................... 702/150, 167, 702/168, 169, 151, 157; 364/474.37, 474.35; 33/503, 504, 505, 554, 569, 644, 548, 645

[56] References Cited

U.S. PATENT DOCUMENTS

| 3,911,257 | 10/1975 | Whitehouse et al. | 702/168 |
|---|---|---|---|
| 4,070,762 | 1/1978 | Siddall | 702/157 |
| 4,731,934 | 3/1988 | Barnaby et al. | 33/504 |
| 4,807,152 | 2/1989 | Lane et al. | 702/168 |
| 5,151,870 | 9/1992 | Beebe et al. | 702/168 |
| 5,204,824 | 4/1993 | Fujimaki | 364/474.37 |
| 5,434,803 | 7/1995 | Yoshida | 702/168 |
| 5,485,406 | 1/1996 | Wada et al. | 702/167 |

FOREIGN PATENT DOCUMENTS

| 0 068 082 | 3/1982 | European Pat. Off. . |
|---|---|---|
| 0 240 150 | 10/1987 | European Pat. Off. . |
| 2039050 | 7/1980 | United Kingdom . |

OTHER PUBLICATIONS

T. Pfeifer et al., "Lageprufing an Freiformkurven und –flachen in der Xoordinatenmesstechnik," Technisches Messen, vol. 56, No. 1, Jan. 1, 1989 Munchen, pp. 17–22.

Stanislaw Adamczak, "Bezugsmethoden fur die Messung von rundheitsabweichungen—Entwicklung einer computergestutsten Losung (Teil 2) & Symposium VON17–09–1993," Elektrotechnik Und Informationstechnik, vol. 11, No. 6, Dec. 2, 1994 Wien AT, pp. 327–331.

Jiubin Tan et al., "The Least Square Circle Model and Parametric Estimating Method for the Superprecision Measurement of Circle Contour," Robotics, CIM and Automation, Emerging Technologies, San Diego, Nov. 9–13, 1992, Institute of Electrical Engineers, pp. 813–817.

V. Jayaraman and Jay Raja, "A Simple and Effective Method to Account for Tilt and Eccentricity in Roundness Measurements," Proceedings of the 1994 Annual Conference of the American Society of Precision Engineers, Session 7, pp. 141–144.

*Primary Examiner*—John Barlow
*Assistant Examiner*—Hien Vo
*Attorney, Agent, or Firm*—Lerner, David, Littenberg, Krumholz & Mentlik, LLP

[57] ABSTRACT

A roundness measuring machine is described which measures the position of the surface of an object as the object is rotated on a turntable. The machine determines the circle which is the best fit to the measured points and converts the measurements to distances from the best fit circle. An improved algorithm for determining the best fit circle is used in place of the limacon fit. Calculated differences between the measured surface position and the best fit circle are corrected for the effect of measuring the difference in the direction towards the center of rotation of the turntable instead of in the direction towards the center of the circle. Data values are calculated representing points at equal angles around the center of the best fit circle rather than equal angles around the center of rotation of the turntable. The improved accuracy of correction allows the machine to tolerate greater eccentricity of the workplace relative to the turntable, reducing the necessity for accurate centering of the workpiece.

13 Claims, 8 Drawing Sheets

FIG. 11

$DATA_k = [0.8n_i + n_i+1 + n_i+2 + n_i+3 + n_i+4 + 0.4n_i+5] / 5.2$ $DATA_{k+1} = [0.5n_i+1 + n_i+2 + n_i+3 + n_i+4 + n_i+5 + 0.7n_i+6] / 5.2$ $DATA_{k+2} = [0.2n_i+2 + n_i+3 + n_i+4 + n_i+5 + n_i+6 + n_i+7] / 5.2$

FIG. 12

| $n_i + 8000$ | $n_i + 8001$ | $n_i + 8002$ | $n_i + 8003$ | $n_i + 8004$ | $n_i + 8005$ | $n_i + 8006$ | $n_i + 8007$ | $n_i + 8008$ |
|---|---|---|---|---|---|---|---|---|
| $\alpha_i + 8000$ | $\alpha_i + 8001$ | $\alpha_i + 8002$ | $\alpha_i + 8003$ | $\alpha_i + 8004$ | $\alpha_i + 8005$ | $\alpha_i + 8006$ | $\alpha_i + 8007$ | $\alpha_i + 8008$ |
| $\theta_j + 8000$ | $\theta_j + 8001$ | $\theta_j + 8002$ | $\theta_j + 8003$ | $\theta_j + 8004$ | $\theta_j + 8005$ | $\theta_j + 8006$ | $\theta_j + 8007$ | $\theta_j + 8008$ | $\theta_j + 8009$ | $\theta_j + 8010$ | $\theta_j + 8011$ |

$$DATA_{k+8000} = [0.4n_i + 8000 + n_i + 8001 + n_i + 8002 + 0.4n_i + 8003]/2.8$$

$$DATA_{k+8001} = [0.7n_i + 8001 + n_i + 8002 + n_i + 8003 + 0.1n_i + 8004]/2.8$$

$$DATA_{k+8002} = [n_i + 8002 + n_i + 8003 + 0.8n_i + 8004]/2.8$$

ROUNDNESS MEASURING

The present invention relates to measuring the roundness of a component using a roundness measuring machine.

Typically, a roundness measuring machine will have a motorised turntable and a holder for a measuring probe. It is normally used to measure the roundness of a component such as a crankshaft which is intended to have a circular cross-section. In use, the component is placed on the turntable with its axis co-axial with the axis of rotation of the turntable (known as "the spindle axis"), and the tip of a stylus of a measuring probe or gauge which is mounted on the holder is brought into contact with the surface of the component. The turntable is rotated and the angular position of the turntable together with the output from the measuring gauge are repeatedly logged. The logged data provides detailed information about the precise shape of the cross-section of the component at the level where the stylus tip contacted it. Such data can be processed, for example to provide a measure of the extent to which the shape of the cross-section has waveform undulations rather than being truly circular.

As is well known in the art, such roundness machines are normally provided with a centring and levelling mechanism, by which the turntable can be moved radially with respect to the spindle axis and also can be tilted. When a component is placed on the turntable, the axis of the component will normally be slightly offset from the spindle axis for turntable rotation, and additionally the axis of the component may not be precisely parallel to the spindle axis. By operation of the centring and levelling mechanism, the turntable is moved and tilted so as to bring the component axis to be parallel to the spindle axis (levelling) and to bring the component axis into line with the spindle axis (centring).

Normally, a centring and levelling operation comprises rotating the turntable and the workpiece twice, with the stylus tip contacting the workpiece at different heights, and analysing the data thus obtained to provide instructions for the amount of sideways shift of the turntable in each of two directions and the amount of tilting of the turntable about each of two axes. U.S. Pat. No. 4,731,934 (Barnaby & Mills) and EP-A-0240150 (which are incorporated herein by reference) disclose an automated arrangement in which the centring and levelling mechanism is driven by four motors which are controlled by computerised processing means so as to perform the centring and levelling movements as calculated by the processing means from the data obtained during the measurements of the workpiece taken at two heights as discussed above. As mentioned in U.S. Pat. No. 4,731,934 and EP-A-0240150, the centring and levelling mechanism may alternatively be manually operable, and processing means can be arranged to output to an operator information about the adjustments required. Various designs of manually operable centring and levelling mechanisms are known.

After the centring and levelling operation has been completed, the precise shape of the cross-section of the component can be measured at various heights as desired, by rotating the turntable about the spindle axis while the stylus tip contacts the workpiece, and logging the consequent data. In the analysis of this data, it is possible to detect and measure slight eccentricity of the measured cross-section with respect to the spindle axis, resulting from a residual off-centredness or tilt of the workpiece. It is known in the art, and has been discussed in various publications by D. G. Chetwynd, to determine the degree of eccentricity by fitting the data for the shape of the cross-section to the equation for a limacon, and the resulting information about the degree of eccentricity can be used to re-centre the data relating to the positions of the stylus tip during rotation of the workpiece so that the measurements are centred on the centre of the measured cross-section rather than on the spindle axis. For accurate work of the type for which roundness machines are normally used, such a technique provides acceptably accurate results provided that the degree of eccentricity of the measured cross-section relative to the spindle axis does not exceed 0.001 of the radius of the workpiece, and preferably does not exceed 0.0005 of the radius of the workpiece. Therefore, for a component with a radius of 5 mm, the eccentricity should be less than 5 $\mu$m, preferably less than 2.5 $\mu$m. For larger radius components, larger eccentricities can be tolerated, but a component having a radius of 500 mm (i.e. a diameter of 1 metre), which is much larger than a normal roundness measuring machine can handle, should be placed with an eccentricity not exceeding 0.5 mm, preferably 0.25 mm. The centring and levelling operation discussed above is normally conducted so as to ensure that the workpiece will be centred at all measurement heights to within a target limit which is typically set to be within the range of 3 to 5 $\mu$m.

If there is any residual tilt in the orientation of the workpiece after centring and levelling (i.e. the axis of the workpiece is still not quite parallel to the spindle axis), this has two effects. First, it means that the cross-section, the shape of which is measured by movement of the stylus tip while the turntable rotates, is in a plane which is not quite at right angles to the axis of the workpiece. Methods are known to those skilled in the art to correct the data from the stylus for this effect, so as to obtain highly accurate estimates of the data which would be obtained for a cross-section which is precisely at right angles to the axis of the workpiece, and therefore this effect does not normally cause problems in practice. An example of such a way for correcting for residual tilt is mentioned in "A Simple and Effective Method to Account for Tilt and Eccentricity in Roundness Measurements" V. Jayaraman and Jay Raja, Proceedings of the 1994 Annual Conference of the American Society of Precision Engineers, Session 7. The second effect of residual tilt is that the degree of eccentricity of any cross-section through the workpiece will vary with the height (distance in the axis direction) at which the cross-section is taken. Accordingly, although the eccentricity may be less than 5 $\mu$m at one level up the workpiece, residual tilt of the workpiece may result in the cross-section at another level having an eccentricity greater than 10 $\mu$m. On many occasions, the main reason for needing to eliminate tilt of the workpiece is to ensure that the residual eccentricity following centring remains within acceptable limits at all heights at which the cross-section will be measured, rather than being acceptable at some heights but unacceptable at others.

According to a first aspect of the present invention, there is provided a roundness measuring machine having a rotatable turntable and means to log data representing the position of a surface of the workpiece at a plurality of known angles of rotation of the turntable about the axis of rotation of the turntable, and processing means programmed (a) to calculate the degree of eccentricity of the measured cross-section of the workpiece, (b) correlate angles of rotation of the workpiece about the axis of rotation of the turntable with angles of rotation of the workpiece about the centre of the measured cross-section, and (c) derive from the logged data, data relating to the position of the surface of the workpiece at a plurality of positions around the workpiece which are spaced by substantially equal angles with reference to the centre of the measured cross-section of the workpiece. Preferably, the processing means is programmed to conduct filtering of the logged data, and is programmed to vary the angular distance, measured with respect to the axis of rotation of the turntable, by which the filter envelope is moved through the data to provide successive output values, the variation being in accordance with the correspondence between angles around the axis of rotation of the turntable and angles around the centre of the cross-section through the workpiece, so that the filtered data values represent points spaced around the surface of the workpiece at equal angles relative to the centre of the cross-section.

Normally, the turntable or some other part which rotates with it will be provided with a grating or other measuring system whereby the angle of rotation of the turntable about its axis of rotation can be monitored accurately as the turntable rotates.

One effect of eccentricity of the cross-section of the workpiece relative to the spindle axis is that, for a constant speed of rotation of the turntable, the surface speed of the workpiece past the stylus tip is not constant. When the centre of the cross-section of the workpiece is between the axis of rotation and the stylus tip, the surface of the workpiece moves past the stylus tip relatively fast. At this point, rotation of the workpiece through a given angle centred on the axis of rotation moves the surface by a distance which represents a greater angle centred on the centre of the cross-section. Conversely, when the centre of the cross-section of the workpiece is the far side of the axis of rotation from the stylus tip, the surface of the workpiece moves past the stylus tip relatively slowly, and rotation of the workpiece through a given angle about the centre of rotation moves the surface of the workpiece past the tip by a distance which represents a smaller angle when centred on the centre of the cross-section.

Accordingly, it can be seen that if data is logged from the stylus at equal angles of rotation of the workpiece about the axis of rotation, the measured points are unevenly spaced around the surface of the workpiece. Since the analysis algorithms normally used to analyse the data logged by a roundness machine assume that the data points represent equal angles around the centre of the measured cross-section, this is a source of inaccuracy in the subsequent analysis results. This is one of the reasons why the prior art roundness machines could not tolerate substantial eccentricities when providing acceptably accurate measurement results. It would be possible to overcome this problem by using different algorithms for analysing the data, which do not make the assumption that the data points represent equal angles about the centre of the cross-section, but normally such algorithms require an increased amount of calculation and consequently take longer to perform. This aspect of the present invention provides the advantage that, once the initial correction of the angular spacing of the data points has been made, the conventional relatively simple and high speed algorithms for subsequent processing can be used.

According to another aspect of the present invention there is provided a roundness measuring machine comprising a rotatable turntable, means for supporting a measuring probe with a stylus in contact with a workpiece mounted on the turntable, means to log data from the measuring probe as the turntable rotates, and processing means programmed (a) to determine the degree of eccentricity of the cross-section through the workpiece represented by data from the probe, and (b) to compensate data representing the position of the surface of the workpiece as obtained from the probe for the effect of the detected eccentricity so as to obtain compensated data values nominally centred on the centre of the cross-section of the workpiece, wherein the programming means is programmed to perform the compensation by adding to or subtracting from the data representing the position of the surface of the workpiece the value of a compensation function representing a limacon equation for re-centring the data at the centre of the cross-section together with a first correction factor for taking into account the variation, dependent on the angle of rotation, between a limacon equation and the complete equation for an eccentric circle, and a second correction factor which is at least approximately equal to the angle-independent constant in an expression having the form of the equation for an eccentric circle having the same radius as the workpiece but which integrates to zero, or an operation or operations which provide an equivalent effect.

In order to obtain useful information about the shape of a measured cross-section of a workpiece, such as the deviation of the shape of the cross-section from a circle, it is normally necessary to consider data for the distance between various points around the cross-section and the centre of the cross-section, or alternatively data representing the distance between points around the edge of the cross-section and a circle centred on the centre of the cross-section. If the shape of the cross-section is precisely circular, such distances will be the same for all points around the cross-section. However, if the cross-section is eccentric relative to the axis of rotation, the values obtained for points around the surface of the workpiece will not be centred on the centre of the cross-section. In the past, the data for the points around the edge of the workpiece have been fitted to a limacon equation, and the limacon equation thus obtained has been regarded as the equation for a circle centred on the centre of the cross-section of the workpiece, so that the difference between the value of the limacon equation at any particular angle and the value of the measured data at that angle provides a measure of the difference between the edge of the workpiece at that angle and a circle centred on the centre of the cross-section of the workpiece.

However, the equation for a limacon is not exactly the same as the equation for an eccentric circle (i.e. the equation in a coordinate system for a circle having a centre offset from the origin of the coordinate system). The difference between the equations is a term the value of which varies with angle about the origin of the coordinate system (i.e. the angle about the axis of rotation), and the effect of this term cannot be accounted for by adjusting any of the constants in the limacon equation. Consequently, the use of a limacon equation as an equation for the reference circle centred on the centre of the cross-section generates slight inaccuracies in the values of the data after compensation for the effect of eccentricity of the cross-section.

Additionally, the output from the probe of a roundness measuring machine is not normally a value representing the distance between the surface of the workpiece and the centre of rotation of the turntable, but is data representing the distance between the surface of the workpiece and a zero position for the probe. With rotation of the turntable, the zero position of the probe translates into a circle centred on the axis of rotation of the turntable, the radius of which is not precisely known. Accordingly the data representing the edge of the workpiece is in terms of distance from a circle centred on the axis of rotation, but having an unknown radius.

For analysis of the data it is normally necessary to transform the data representing points around the surface of the workpiece into measurements of deviations of the position of the surface of the workpiece from the circle representing the average radius of the workpiece. If the workpiece is exactly centred on the axis of rotation, this can be done even though the radius represented by the zero position of the probe is unknown, by subtracting from each value for the position of the surface of the workpiece the average of all such values. In the case where some workpiece eccentricity is detected and a limacon correction is applied as discussed above, the same effect can be provided by selecting the term in the limacon equation which does not vary with angle so that the sum of the compensated data values (i.e. the sum of the differences between the uncompensated data values and the corresponding values of the limacon equation) equals zero. If the data is being compensated using the correct equation for an eccentric circle rather than the equation for a limacon, the value for the angle independent part of the equation for the eccentric circle should similarly be selected so that the sum of the compensated data equals zero. The value required for the angle independent part of the equation for the eccentric circle is different from the value required for the angle independent part of the equation for a limacon. This difference arises because the angle-dependent parts of the equation for a limacon integrate to zero over 360° whereas the angle-dependent parts of the equation for an eccentric circle do not integrate to zero over 360°. Consequently, although it is convenient to find the equation for the limacon which fits best to the data for the shape of the workpiece surface in order to identify the eccentricity of the cross-section of the workpiece which is being measured, the value for the angle independent part of the best fit limacon should have an adjustment factor added to it before being used as the angle independent part of the equation for the best fit eccentric circle. The magnitude of this compensation factor increases as the proportionate eccentricity increases (the proportionate eccentricity is the ratio between the eccentricity and the radius of the workpiece).

Accordingly, the adjustments proposed for the compensated data in the present aspect of the invention, as compared with data which is compensated by subtracting the best fit limacon equation, will give more accurate values for the difference between the surface of the workpiece at a particular point and the best fit circle centred on the centre of the cross-section of the workpiece being measured. Additionally, the improvement in accuracy becomes more significant as the eccentricity of the cross-section relative to the spindle axis increases.

In another aspect of the present invention there is provided a roundness measuring machine having a rotatable turntable and a probe holder for holding a probe for measuring the position of the surface of a workpiece mounted on the turntable as the turntable rotates, and processing means programmed to compensate data from the probe (representing the position of the surface of the workpiece at a cross-section of the workpiece) for the effect of eccentricity of the cross-section relative to the axis of rotation of the turntable by (i) finding the differences between the measured positions of the surface of the workpiece and an estimate for the position of a circle centred on the centre of the cross-section of the workpiece and (ii) compensating the differences for the effect of measuring the differences along a line to the axis of rotation of the turntable instead of measuring them along a line to the centre of the cross-section, or programmed to perform operations having an equivalent effect.

In the preferred embodiment, the effect of measuring the differences along the line to the spindle axis instead of measuring them to the centre of the cross-section is compensated for by dividing the difference between the measured position of the surface of the workpiece and the circle centred on the centre of the cross-section by the cosine of a value for the angle between the line from the point on the surface of the workpiece to the axis of rotation of the turntable and the line from the point on the surface of the workpiece to the centre of the cross-section.

For a point on the surface of the workpiece which is offset sideways from the line joining the axis of the rotation of the turntable to the centre of the cross-section of the workpiece being measured, the line to the axis of rotation will pass obliquely across the gap between the point on the surface of the workpiece and a circle centred on the centre of the cross-section. Therefore a measurement of the size of the gap along this line will be too large compared with a measurement of the size of the gap in the direction to the centre of the cross-section. The percentage error in this measurement varies depending on the position of the point under consideration around the circumference of the cross-section, and it also varies with the degree of eccentricity of the cross-section of the workpiece compared with the axis of rotation of the turntable. If the eccentricity of the workpiece is $2/3$ of its radius, this effect will create an error of more than 10% in the value for the distance between the circle centred on the centre of the cross-section and the point on the surface of the workpiece which is most susceptible to this effect.

Normally, the form of probe used with a roundness measuring machine comprises a gauge having a stylus the tip of which contacts the surface of the workpiece being measured, and the gauge provides measurements of displacement of the stylus as the turntable rotates. However, all aspects of the present invention are not limited to this form of gauge, and other types of probe for measuring the position of the surface of the workpiece are possible, including non-contact probes using optical or magnetic effects.

All aspects of the present invention, whether used separately or in combination, tend to increase the accuracy with which data from a roundness measuring machine is compensated for the effects of eccentricity in the cross-section of the workpiece being measured. One consequence of this is that, for a given required level of accuracy in the data, a greater degree of eccentricity can be tolerated. Accordingly, it is not necessary to perform centring and levelling of the workpiece to such high precision. In the preferred embodiment, an acceptable degree of accuracy of measurement can be obtained provided that the eccentricity of the workpiece is not greater than $2/3$ of the radius of the workpiece and additionally provided that the eccentricity is not so great that the differences in the distance of the surface of the workpiece from the axis of rotation are greater than the range of the measuring gauge or other probe.

At present, known types of contacting stylus type probes with a linear variable differential transformer gauge allow a gauge range of about + or −1 mm (although it is expected that probes having a greater range will become available in the future). A skilled operator can normally place the workpiece on a turntable and adjust it by eye to be centred to 0.5 mm or less, which means that the centring and levelling operation can be entirely dispensed with except with components which are very tall or have a very small radius. Additionally, a simple jig for holding components will normally position components to within 0.2 to 0.5 mm. Therefore a jig clamped to the turntable will normally locate a workpiece with sufficient accuracy provided that the jig is accurately centred. This means that after a centring and levelling operation has been conducted to ensure that the jig is correctly centred, successive workpieces can be placed in the jig and measured without the need for individual centring and levelling operations for each workpiece. This can substantially increase the speed with which large numbers of nominally identical components can be measured, and also permits the measurements to be carried out by less skilled people.

Preferred embodiments of the present invention, given by way of non-limiting example, will now be described with reference to the accompanying drawings, in which:

FIGS. 11 and 12 show schematically the operation of a retiming and data reducing filter.

Figure 1:
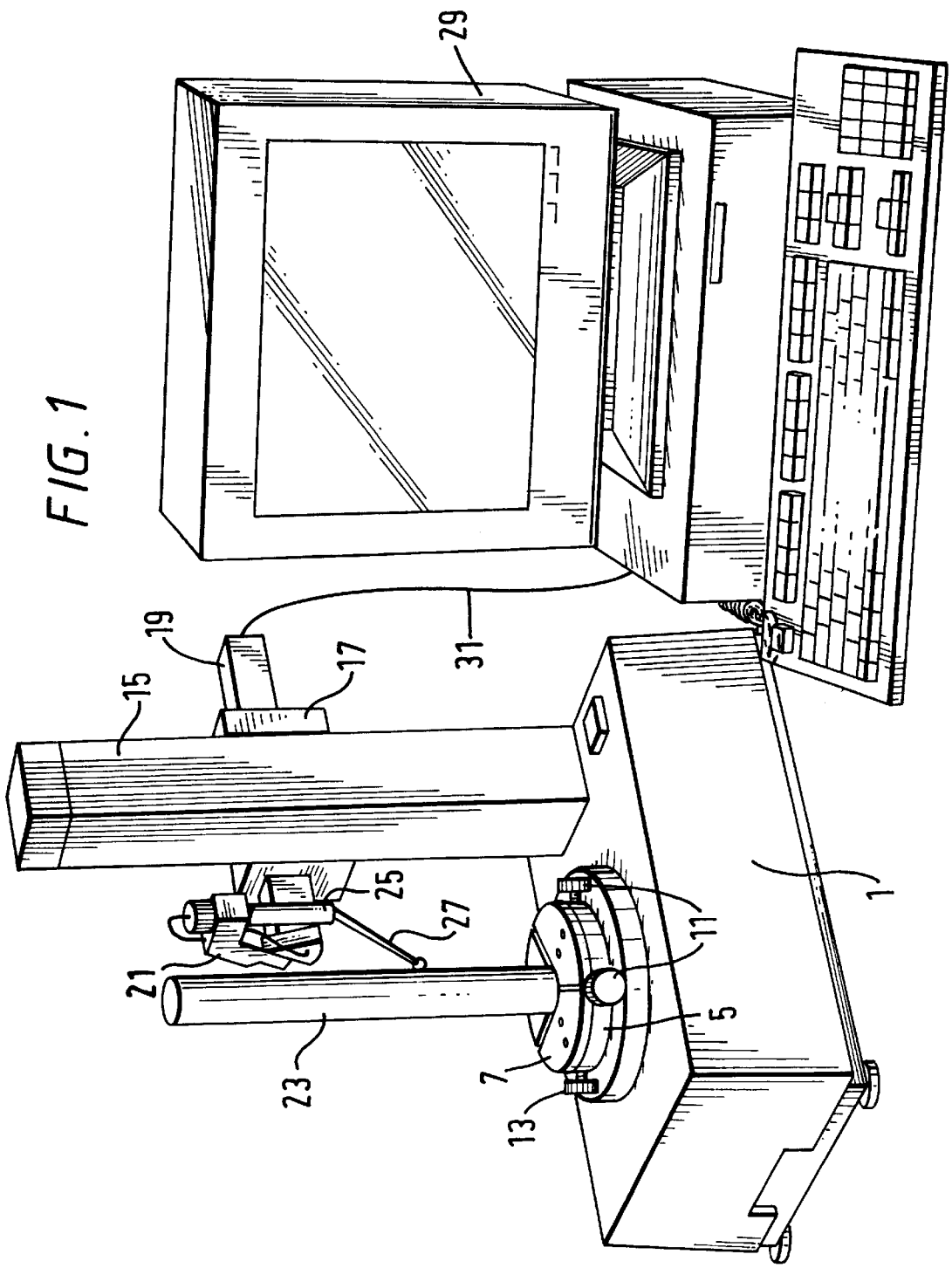
FIG. 1 shows a roundness measuring machine embodying the present invention.
Figure 2:
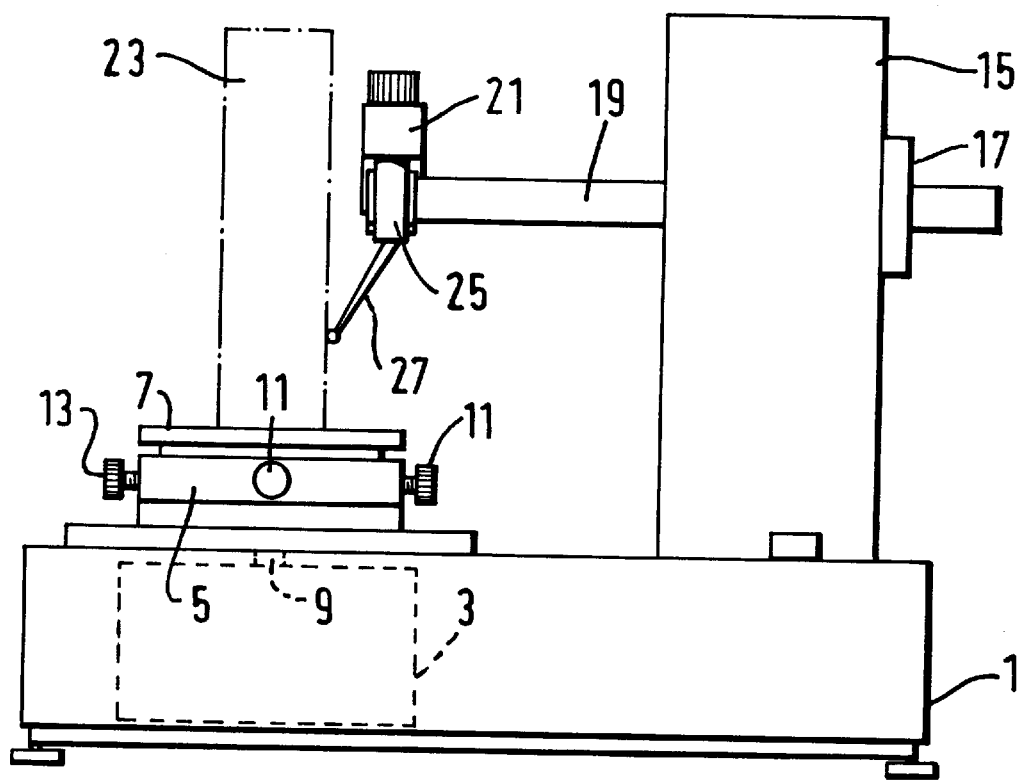
FIG. 2 is a side view of the turntable and probe unit of the machine of FIG. 1.
Figure 3:
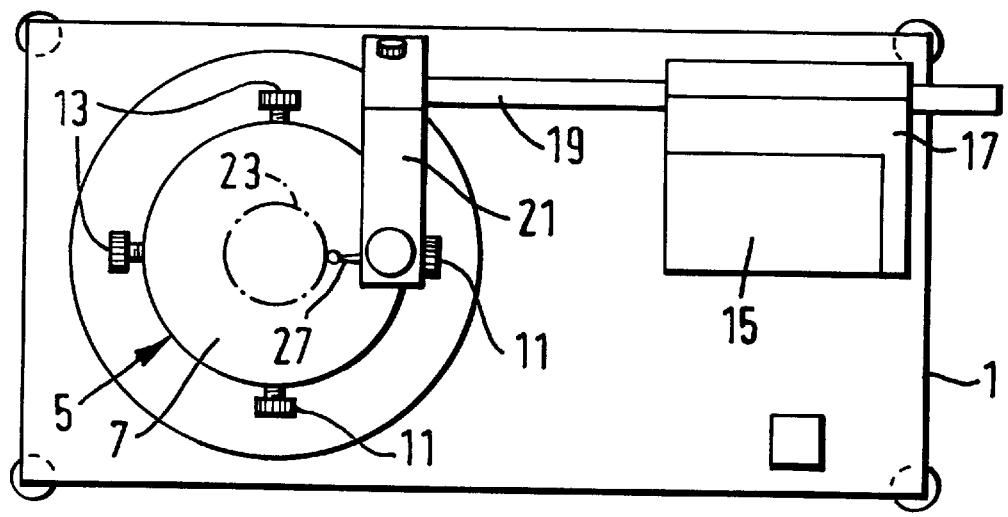
FIG. 3 is a top view of the turntable and probe unit of the machine of FIG. 1.
Figure 4:
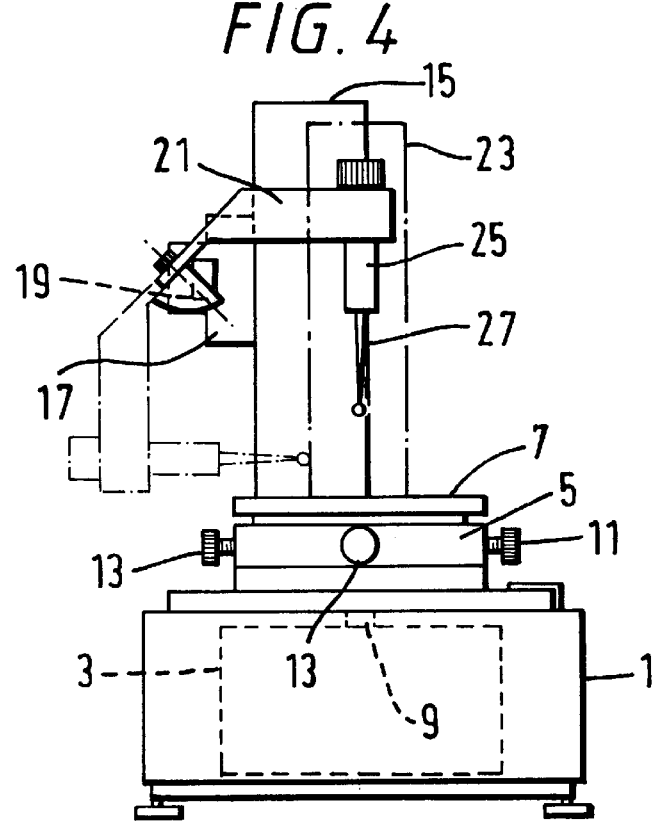
FIG. 4 is an end view of the turntable and probe unit of the machine of FIG. 1.

FIG. 1 shows a roundness measuring machine embodying the present invention. FIG. 2 is a side view of the turntable and probe unit of the machine of FIG. 1. FIG. 3 is a top view of the turntable and probe unit of the machine of FIG. 1, and FIG. 4 is an end view of the turntable and the probe unit. In the roundness measuring machine, a main housing 1 contains a motor 3 (indicated schematically in FIG. 2), which drives in rotation a centring and levelling unit 5 and a turntable 7 through a drive spindle 9. The centring and levelling unit 5 and the turntable 7 both rotate about the axis of the drive spindle 9.

The centring and levelling unit 5 is equipped on its circumference with two centring knobs 11 and two levelling knobs 13. Manual rotation of a first one of the centring knobs 11 moves the turntable 7 in a first horizontal direction relate to the centring and levelling unit 5 and the drive spindle 9 (taking the axis of rotation of the drive spindle 9 as the vertical direction). Manual rotation of the other one of the centring knobs 11 moves the turntable 7 in a second horizontal direction relative to the centring and levelling unit 5 and the drive spindle 9, orthogonal to the first horizontal direction. Manual rotation of a first one of the levelling knobs 13 tilts the turntable 7 by rotating it relative to the centring and levelling unit 5 and the drive spindle 9 about a first horizontal axis. Manual rotation of the other one of the levelling knobs 13 tilts the turntable 7 by rotating it relative to the centring and levelling unit 5 and the drive spindle 9 about a second horizontal axis orthogonal to the first horizontal axis. Mechanisms by which the centring and levelling unit 5 converts rotation of the centring knobs 11 and the levelling knobs 13 into such movements of the turntable 7 are well known to those skilled in the art. In most cases, such mechanisms are designed so that the first and second horizontal axes of rotation for tilting the turntable 7 intersect the axis of rotation of the drive spindle 9 at a predefined point above the turntable 7, which is referred to as the focus.

A column 15 extends upwardly from the main housing 1. A slider 17 is movable up and down the column 15, and carries a horizontally extending arm 19. The end of the arm 19 carries a probe holder 21 arranged to support a measuring probe. Movement of the arm 19 relative to the slider 17 will move a probe mounted in the probe holder 21 towards and away from the axis of rotation, thereby accommodating workpieces of different radii.

In use, an object 23 the roundness of which is to be measured (referred to as a workpiece or a component), is placed on the turntable 7 and a probe is fitted to the probe holder 21. In FIGS. 1 to 4, a conventional contacting type stylus gauge is used as the probe. This comprises a gauge body 25 which supports a stylus 27, and the arm 19 is adjusted so that the tip of the stylus 27 just contacts the surface of the workpiece 23. A transducer in the gauge body 25 outputs a signal representing the angle of the stylus 27 relative to the gauge body 25, and consequently this signal represents the position of the tip of the stylus 27.

To perform a roundness measuring operation the motor 3 is driven so as to rotate the turntable 7 slowly through 360°. Typically, the turntable is rotated at about six revolutions per minute. The angle of rotation about the axis of drive spindle 9 is monitored, for example by providing a grating circumferentially around the drive spindle 9 and monitoring movement of the grating. Such arrangements are well known in the art. The value of the output signal from the probe mounted in the probe holder 21 is logged for 16,000 points, spaced at equal angles around the axis of the drive spindle 9, during one rotation of the turntable 7. These data values are provided to a processing means of the roundness measuring instrument. In principle, the processing means can be incorporated within the main housing 1. However, it is generally move convenient to provide at least a part of the processing means in the form of a separate processor 29, such as a personal computer, connected to the main housing 1 by a flexible cable 31, as shown in FIG. 1. Because the 16,000 data points are taken at equal angles around the axis of rotation, each data point can be associated with a particular value for the angle of the turntable 7, relative to an arbitrary reference direction.

Figure 5:
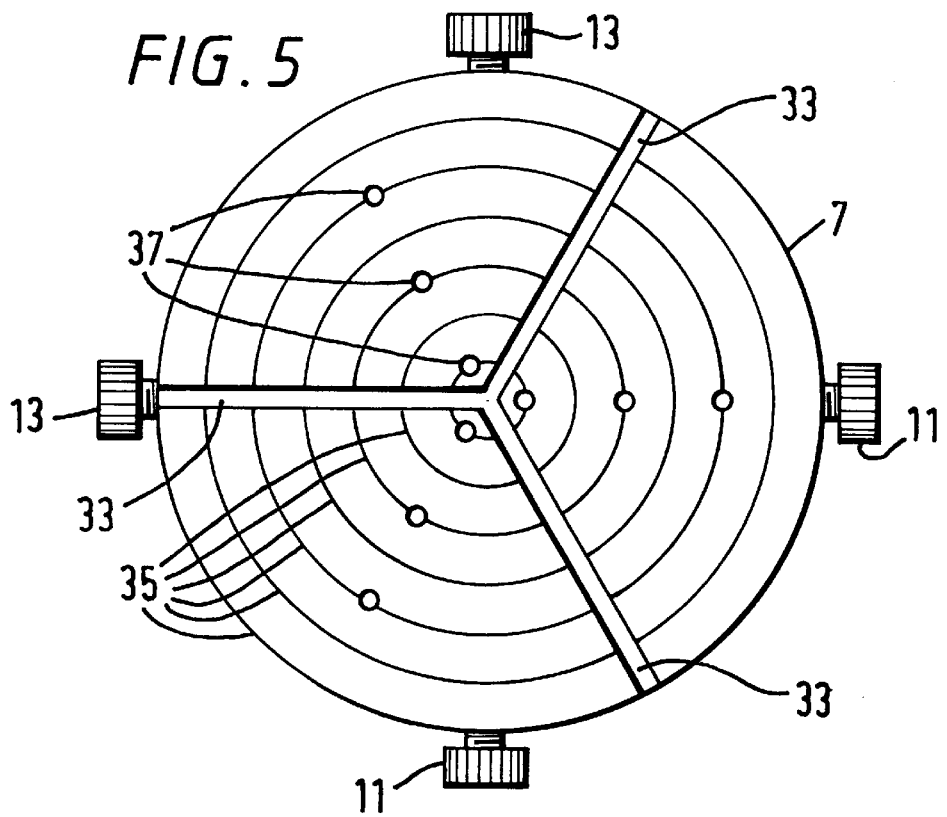
FIG. 5 is a view of the turntable and the centring and levelling unit from above.

FIG. 5 is a view of the turntable 7 and the centring and levelling unit 5 from above, showing the top surface of the turntable in more detail. The main body of the centring and levelling unit 5 cannot be seen because it is hidden by the turntable 5, but the centring knobs 11 and levelling knobs 13 are visible.

As shown in FIG. 5, the top surface of the turntable 7 has three grooves 33 extending at equal angles away from the centre of the surface. These enable accurate location of further pieces of equipment on the top of the turntable 7 with a three-point kinematic mount if the further item is provided with three ball feet. Additionally, a series of concentric circles 35 are scribed on the top surface of the turntable 7, centred on the centre of the surface. These provide a visual guide for an operator to help in the correct placing of a component on the turntable 7. Finally, three lines of tapped holes 37 are formed in the top surface of the turntable 7, each line extending away from the centre of the top surface and the lines being spaced at equal angles around the centre of the top surface. The tapped holes 37 allow a further part to be clamped rigidly to the turntable 7.

In use of the illustrated embodiment, the workpiece 23 should be positioned with its central axis sufficiently close to the axis of rotation that variations around the circumference of the workpiece in the distance from the edge of the workpiece to the axis of rotation do not exceed the measurement range of the probe mounted in the probe holder 21. In the case of a conventional contacting stylus type probe with an inductive transducer as illustrated in FIGS. 1 to 4, this means that the distance between the axis of the workpiece and the axis of rotation should not exceed 1 mm, and should preferably be less than about 0.5 mm. Additionally, the distance between the axis of the workpiece 23 and the centre of rotation of the turntable 7 should not exceed ⅔ of the radius of the workpiece 23.

In order to meet these requirements, the operator can place the workpiece on the turntable 7, centring it by eye using the scribed circles 35 as a reference. Normally, a practised operator can align the axis of the workpiece with the centre of the turntable 7 to an accuracy of about 0.2 to 0.5 mm in this way. In order to check that the workpiece is suitably positioned, the operator can then move the arm 19 so that the tip of the stylus 27 is just not touching the workpiece 23. The operator can then rotate the turntable 7 slowly by hand while watching the size of the gap between the workpiece and the stylus tip. Such an operation will normally enable the operator to position the workpiece 23 so as to meet the above criteria unless the radius of the workpiece is substantially less than 1 mm. Accordingly, it is not necessary to use the centring and levelling unit 5 to adjust the position of the workpiece 23.

Figure 6:
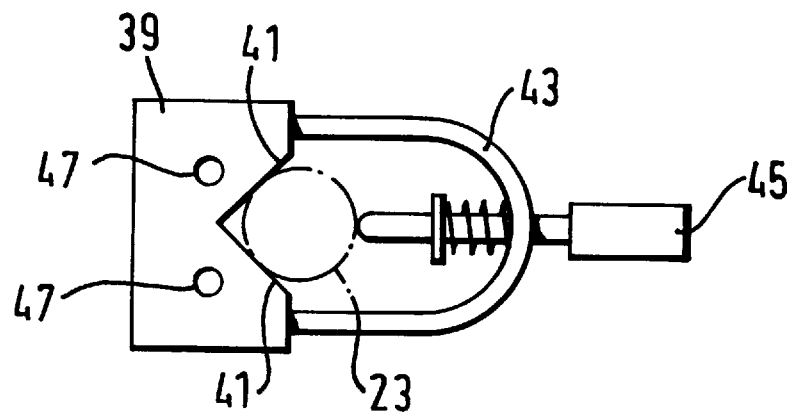
FIG. 6 is a plan view of a jig for use with the machine of FIGS. 1 to 4.

If a large number of nominally identical workpieces are to be measured, for example as quality checking in a production line, it will normally be more convenient to fit a jig to the top surface of the turntable 7, which will allow the operator to place a workpiece in the jig with a quick and simple movement and the operation of the jig will locate the workpiece with sufficient accuracy. FIG. 6 is a plan view of one type of jig which could be designed for this purpose, although many other kinds of jig could be used. In the jig of FIG. 6, a solid metal block 39 has two surfaces 41 which define a V shaped recess for locating the workpiece 23 accurately. A hoop 43 extends from the metal block 39 around the recess defined by the surfaces 41, and a spring-loaded plunger 45 is fitted to the hoop 43. Accordingly, if a workpiece 23 is placed within the V shaped recess of the metal block 39, as shown in broken lines in FIG. 6, the plunger 45 will press the workpiece 23 against the surfaces 41, thereby holding the workpiece 23 in a predefined position relative to the metal block 39.

Figure 7:
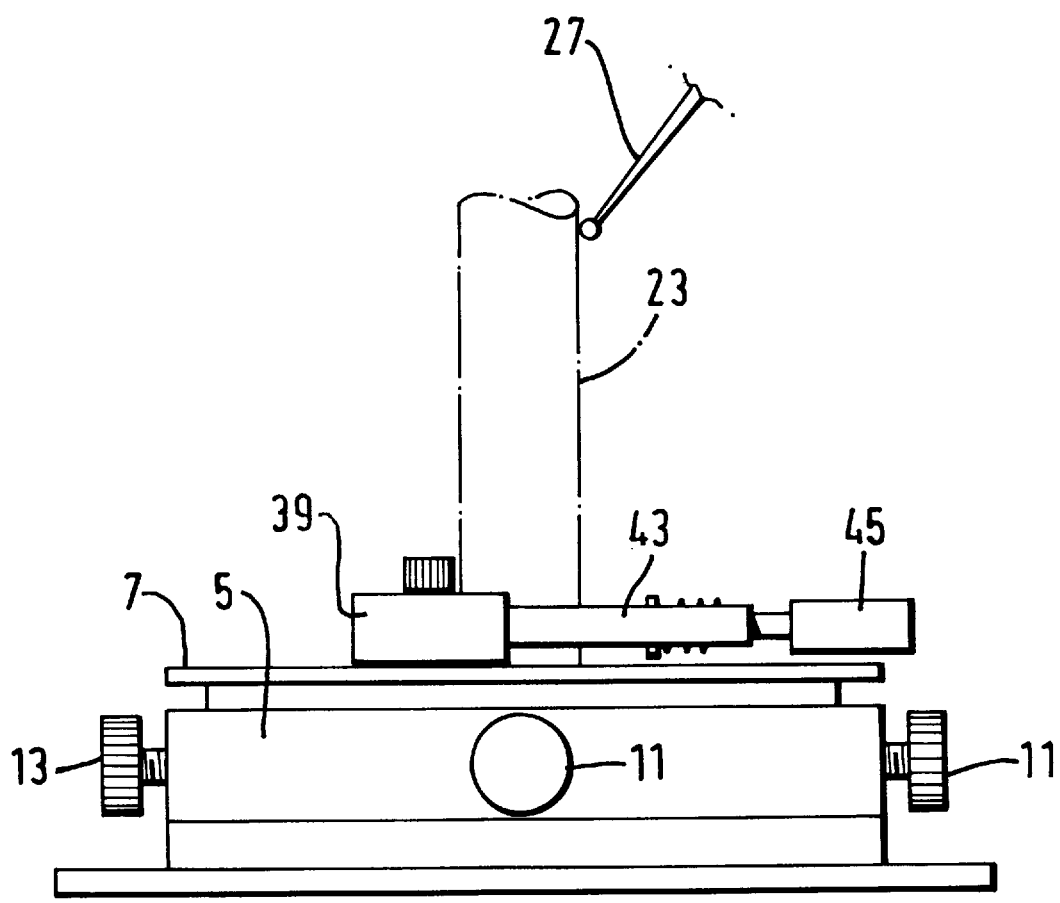
FIG. 7 is a side view of the turntable with the jig of FIG. 6 fitted.

In use, the metal block 39 is screwed rigidly to the top surface of the turntable 7 by bolts which pass through locating holes 47 in the metal block 39 and are screwed into the tapped holes 37 in the top of the turntable 7. FIG. 7 is a side view of the turntable 7 and the centring and levelling unit 5, showing the jig of FIG. 6 mounted on the turntable 7 and a workpiece 23 held in the jig. As shown in FIG. 7, the jig is sufficiently thin that it does not obstruct the stylus 27.

The locating holes 47 are positioned, relative to the positions of the surfaces 41 of the metal block 39, the size of the workpiece 23 with which the jig is to be used, and the positions of the tapped holes 37 in the turntable 7, so that when the jig is mounted on the turntable 7 the workpiece 23 is located with its axis substantially in line with the centre of the turntable 7. With the jig in position, a workpiece 23 is mounted in the jig and then a conventional centring and levelling operation is carried out as is known in the prior art. As discussed above, this will normally locate the workpiece 23 so that its axis is parallel to the axis of rotation and within about 3 to 5 $\mu$m of the axis of rotation. This operation ensures that the jig is accurately located relative to the axis of rotation. Provided that the jig is capable of repeating the position of the workpiece 23 to within about 0.5 mm, successive workpieces can be placed in the jig and measured without the need for any further centring and levelling operation. With an appropriately designed jig, this can enable very quick and easy changeover of workpieces for measurement.

After the turntable 7 has been rotated to measure the shape of the surface of the workpiece 23 at a cross-section through it, and 16,000 data points have been logged as mentioned above, the processor 29 detects and corrects for the eccentricity of the measured cross-section through the workpiece 23 relative to the axis of rotation. The procedure for this correction will now be described, referring to FIGS. 8 and 9 which illustrate the geometry of the arrangement.

Figure 8:
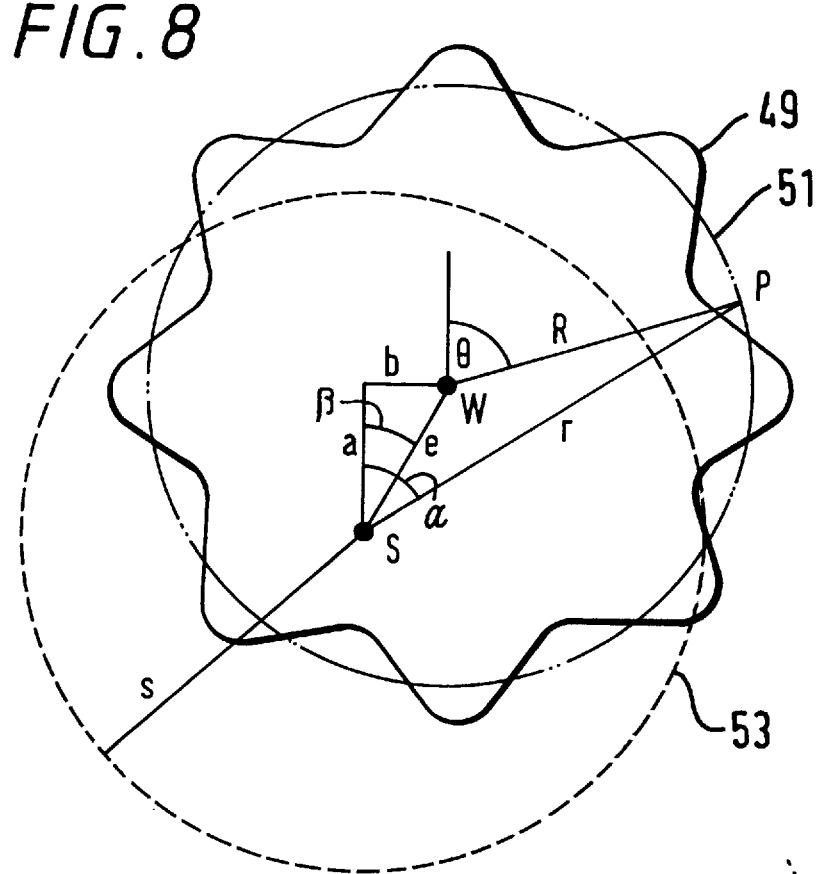
FIG. 8 is a schematic of the geometry of a measuring operation.

In FIG. 8 continuous line 49 represents the outline of the workpiece 23 at the cross-section being measured. Accordingly, the line 49 represents the path taken by the tip of the stylus around the workpiece 23 (in FIGS. 8 and 9 it is convenient to treat the relative rotation between the workpiece 23 and the stylus 27 as rotation of the stylus 27 around the workpiece rather than rotation of the workpiece). Nominally, this cross-section through the workpiece 23 is a circle of radius R, but in practice the surface of the workpiece 23 is slightly wavy, and this waviness is greatly exaggerated in FIG. 8 for clarity of illustration. The broken line 51 represents the circular shape which the surface of the workpiece should have. Accordingly, the difference between the continuous line 49 and the broken line 51 represents the error in the shape of the workpiece 23. The broken line 51 is a circle of radius R centred on point W which is the centre of the cross-section through the workpiece.

The gauge fitted to the probe holder 21 provides a zero output if the tip of the stylus 27 is at a mid-point in its range of movement. In FIG. 8, this mid-point of the range of the stylus, representing a zero output, is shown as the dotted line circle 53. This circle is centred on the spindle axis S (i.e. the axis of rotation of the turntable 7). The radius of the circle 53 is s, which is the distance the spindle axis S and the tip of the stylus 27 for zero output from the gauge. The distance s is not necessarily the same as the nominal radius R of the workpiece 23, although these distances will normally need to be similar to each other in order to ensure that the gauge remains within its measuring range for all angles of the turntable 7. Points outside the circle 53 will be considered as having a positive gauge output and points inside the circle 53 will be considered as having a negative gauge output.

As shown in FIG. 8, the centre W of the cross-section of the workpiece is offset from the spindle axis S by a distance e, which is the eccentricity. Accordingly, any point P on the ideal workpiece surface 51 is at a distance equal to the nominal radius R and at an angle $\theta$ relative to the centre W of the cross-section, but is at a distance r and an angle $\alpha$ relative to the spindle axis S. As will be clear from FIG. 8, R is the same for all angles but r varies with angle. Additionally, $\theta$ and $\alpha$ are different from each other except in the case of the points on the ideal workpiece surface 51 which are in line with the direction of the eccentricity e. The angles $\theta$ and $\alpha$ are measured clockwise from a common arbitrary reference direction, which is taken as the direction towards the top of FIG. 8. The eccentricity e is in a direction at an angle $\beta$ to this reference direction, and accordingly the eccentricity e can be resolved into a distance a in the reference direction and a distance b at 90° to the reference direction.

Figure 9:
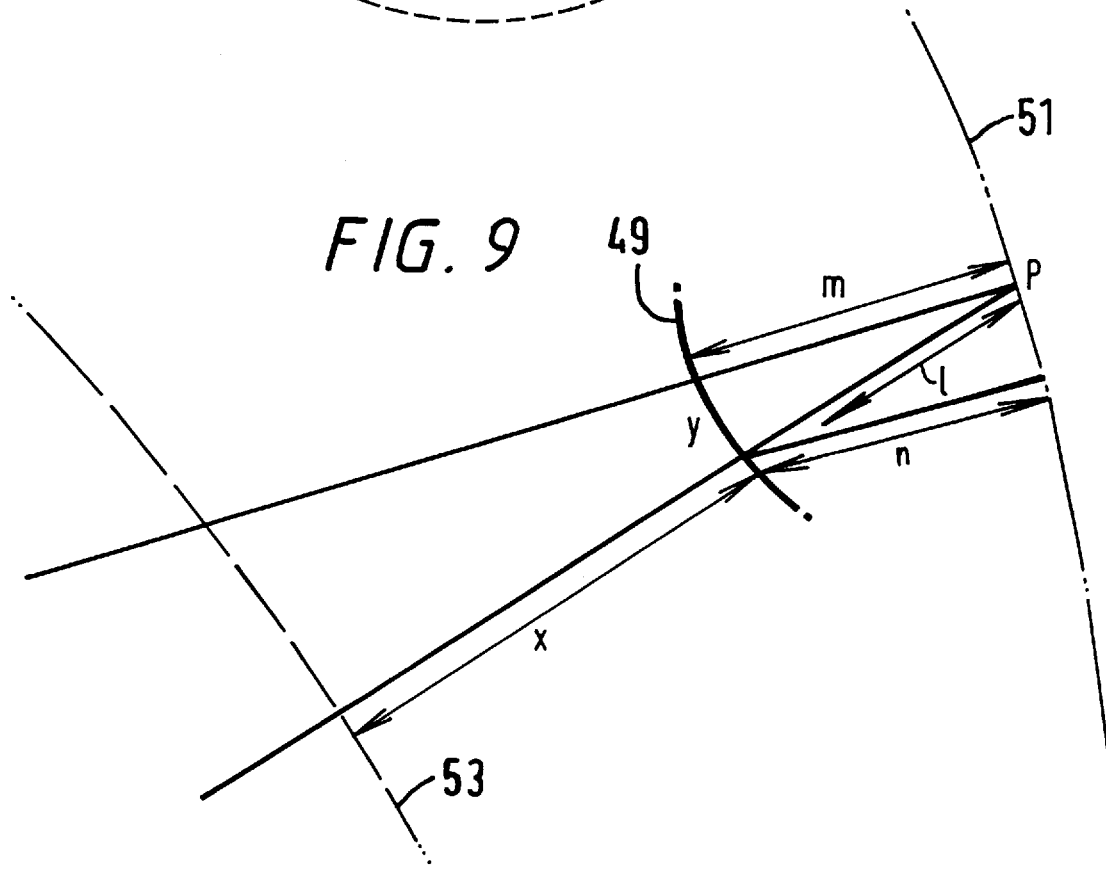
FIG. 9 is an enlarged view of part of FIG. 8.

FIG. 9 is an enlargement of the part of FIG. 8 in the region of one particular point P on the ideal workpiece surface 51. The output from the measuring gauge held by the probe holder 21 for the point P will be a measurement of the distance x in FIG. 9, which is the distance between the zero output circle 53 and the actual surface of the workpiece 49 taken along the line r from the spindle axis S to the point P. As is clear from FIG. 9, the distance x is not the distance between the actual surface of the workpiece 49 and the ideal surface of the workpiece 51, which is the distance which should be measured. If the measurement is still taken along the line r to the spindle axis S, the distance between the actual surface of the workpiece 49 and the ideal surface 15 is the distance 1. Additionally, the distance x will be measured as a positive distance, since the actual surface of the workpiece is outside the circle 51 representing the zero position of the probe, whereas the distance 1 should be measured as a negative distance since the actual surface 49 of the workpiece is inside the ideal surface 51 at this point. Accordingly, it can be seen that the various distances along the line from the point P to the spindle axis S are related by equation 1.

$$s+x=r+l \tag{1}$$

Equation 1 can be rearranged to give an expression for 1 according to Equation 2.

$$l=s+x-r \tag{2}$$

However, 1 cannot be calculated immediately using Equation 2, since the values of s and r are not known. The following geometrical analysis shows how the values of s and r are taken into account.

The angle at point P between the line to the centre W of the cross-section and the line to the spindle axis S is $(\theta-\alpha)$. Considering a theoretical line from the point W which meets the line from P to S at right angles, Equation 3 can be obtained.

$$R \sin(\theta-\alpha)=e \sin(\alpha-\beta) \tag{3}$$

Since $a=e \cos(\beta)$ and $b=e \sin(\beta)$, the right hand half of Equation 3 can be expanded using the formula for the sine of the difference between two angles, and $\beta$ can be eliminated. In this way, and dividing both sides of the equation by R, Equation 4 can be obtained.

$$\sin(\theta - \alpha) = \frac{e}{R}\sin(\alpha - \beta)$$

$$= \frac{a}{R}\sin(\alpha) - \frac{b}{R}\cos(\alpha) \tag{4}$$

By expanding the left hand part of Equation 4 using the expression for the sine of the difference between two angles, and rearranging the terms, Equation 5 can be derived.

$$\tan(\alpha) = \frac{(b/R) + \sin(\theta)}{(a/R) + \cos(\theta)} \tag{5}$$

Equation 5 enables the value of $\alpha$ to be found which corresponds to any given value for $\theta$.

Returning to the hypothetical line from point W which meets the line between P and S at right angles, and considering the triangle formed between this line and point S, it can be seen that the length of this hypothetical line is $e \sin(\alpha-\beta)$, and this hypothetical line divides the distance between P and S into a part towards S having a length of $e \cos(\alpha-\beta)$ and a part towards P having a length $r-\cos(\alpha-\beta)$. Accordingly, consideration of the triangle between this hypothetical line and the point P, Equation 6 is obtained.

$$R^2=[r-e \cos(\alpha-\beta)]^2+[e \sin(\alpha-\beta)]^2 \tag{6}$$

Multiplying out Equation 6 gives Equation 7.

$$R^2 = r^2 - 2er\cos(\alpha - \beta) + e^2\cos^2(\alpha - \beta) + e^2\sin^2(\alpha - \beta) \tag{7}$$

$$= r^2 - 2er\cos(\alpha - \beta) + e^2$$

Solving Equation 7 for r, and also using the trigonometric identity $\cos^2(\alpha-\beta)=1-\sin^2(\alpha-\beta)$ and eliminating $\beta$ as done for Equation 4, gives Equation 8.

$$r = R + a\cos(\alpha) + b\sin(\alpha) - \frac{[a\sin(\alpha) - b\cos(\alpha)]^2}{R + \sqrt{R^2 - [a\sin(\alpha) - b\cos(\alpha)]^2}} \tag{8}$$

Equation 8 is the equation for an eccentric circle having radius R and a centre at point (a,b) in terms of polar coordinates r and $\alpha$. It gives a value of r for any angle $\alpha$, provided that the constants a,b and R are known.

Since R is the nominal radius of the workpiece 23, this is normally known. If for any reason it is not known, it can be estimated by measuring the diameter of the workpiece 23. However, values for a and b must be obtained from the measured data values x. This is done using a limacon approximation.

Equation 9 is the general form of equation for a limacon.

$$r=c+a \cos(\alpha)+b \sin(\alpha) \tag{9}$$

It can be seen that the limacon equation is in the same form as Equation 8, except for the presence of the last term in Equation 8. Using conventional curve fitting techniques, the values for a, b and c in Equation 9 are found which give the best fit (to a least sum of squares criterion) to the measured values x. Although the limacon formula of Equation 9 is only an approximation to the eccentric circle formula of Equation 8, the values for a and b which are obtained in this way are good approximations to the values for a and b in Equation 8, and the form fitting operation is much simpler to carry out using Equation 9 than using Equation 8.

Using the values for a and b obtained in this way, it is now possible to obtain values for r using Equation 8 for every angle $\alpha$. However, it is still not possible to obtain values for l using Equation 2, because the value of s remains unknown. However, during the form fitting procedure, in addition to obtaining values for a and b representing the eccentricity of the measured cross-section relative to the spindle axis, it is also possible to obtain a value for the constant c such that the difference between the measured value x and the constant c sums to zero for all measured points around the surface of the workpiece 23.

If the limacon formula of Equation 9 is regarded as a sufficient approximation to the eccentric circle formula of Equation 8, it would be possible to substitute the values thus determined for a, b and c in Equation 9, to obtain values for a modified distance r', which would represent values for (r-s). Values for l could then be obtained by subtracting r' from x. However, this approach ignores the effect of the last term in Equation 8. The magnitude of this term varies with the angle $\alpha$, which takes account of the fact that the shape of a limacon curve is not precisely circular. Additionally, the magnitude of the last term in Equation 8 depends on the values for a and b relative to the nominal radius R. This means that the deviation between the shape of a limacon curve and a circle increases as the proportionate eccentricity (the value of the eccentricity e as a proportion of the workpiece radius R) increases. Accordingly, the limacon formula is only an acceptable approximation to the eccentric circle formula if the eccentricity of the workpiece 23 is a small proportion of its radius. In order to provide high accuracy results even where the eccentricity is a substantial proportion of the radius of the workpiece 23, the present embodiment uses a different approach.

In the approach of the present embodiment, it is not sufficient to obtain a more accurate formula for r' by using Equation 8 instead of Equation 9 and using the value of c obtained above in place of the nominal radius R as the first term in the formula of Equation 8. A further correction term must be added, to take account of the fact that whereas the second and third terms in Equation 8 and Equation 9 integrate to zero for values of α from 0° to 360°, the last term in Equation 8 does not integrate to zero. Taking this correction factor into account, the present embodiment defines r' as set out in Equation 10.

$$r' = c + F(e, R) + a\cos(\alpha) + b\sin(\alpha) - \frac{[a\sin(\alpha) - b\cos(\alpha)]^2}{R + \sqrt{R^2 - [a\sin(\alpha) - b\cos(\alpha)]^2}} \quad (10)$$

The correction factor $F(e,R)$ is as defined in Equation 11 where $E(e/R)$ represents a complete elliptic integral of the second kind, and $F(e,R)$ is the integral, for values of α from 0° to 360°, of the last term in Equations 8 and 10.

$$F(e, R) = R\left[1 - \frac{2}{\pi}E(e/R)\right] \quad (11)$$

The elliptic integral can be evaluated using the arithmetic-geometric mean algorithm (see "Handbook of Mathematical Functions" by Abramowitz and Stegun, page 598 Sec. 17.6).

In accordance with Equation 10, l can now be obtained by the formula of Equation 12.

$$l = x - r' \quad (12)$$

As an alternative presentation, l can be obtained as a difference between x* and r*, as set out in Equation 13, where x* is the measured data x modified to sum to zero as defined in Equations 14 and 15 and r* is defined by the eccentric circle formula of Equation 8 modified to integrate to zero as set out in Equations 16 and 17.

$$l = x^* - r^* \quad (13)$$

$$x^* = x - c \quad (14)$$

$$\sum x^*_i = 0 \quad (i = 1 \text{ to } 16000) \quad (15)$$

$$r^* = \quad (16)$$

$$F(e, R) + a\cos(\alpha) + b\sin(\alpha) - \frac{[a\sin(\alpha) - b\cos(\alpha)]^2}{R + \sqrt{R^2 - [a\sin(\alpha) - b\cos(\alpha)]^2}}$$

$$\int r^*(\alpha)d\alpha = 0 \quad (\alpha = 0° \text{ to } 360°) \quad (17)$$

Returning to FIG. 9, it can be seen that although l is a distance between the point P on the ideal workpiece surface 51 and a point on the actual workpiece surface 49, the distance l is not measured in the direction towards the centre W of the cross-section through the workpiece 23. Instead, the distance l is measured in the direction towards the spindle axis S. Accordingly, the distance l is not the distance which the roundness machine should be measuring. The machine should be measuring the distance m in FIG. 9. The distance m is different from the distance l in two respects.

First, the distance m is the measurement for a position on the actual surface of the workpiece 49 spaced by a distance y from the position represented by l. Provided that the deviation between the actual workpiece surface 49 and the ideal workpiece surface 51 is very small, the distance y is very small. Accordingly, the present embodiment ignores this effect. For this reason, if the distance m is very large, the present embodiment will provide a slightly inaccurate result. However, this does not matter in practice since if the shape of the workpiece is grossly inaccurate it is not normally necessary to know the precise amount of inaccuracy, whereas it is important to know the precise amount of inaccuracy if the inaccuracy is small.

The second effect is that the distance m crosses the gap between the ideal workpiece surface 51 and the actual workpiece surface 49 in a direction at 90° to the line of the ideal workpiece surface 51, whereas the distance l crosses this gap at a slant, and consequently is too large. The magnitude of this inaccuracy in the distance l is related directly to the angle between the directions of m and l, which is the angle (θ−α). The magnitude of this angle is different for different positions around the surface of the workpiece. However, the maximum value reached by (θ−α), and therefore the maximum error in the distance l as an estimate of the distance m, is directly related to the length of the eccentricity e as a proportion of the nominal radius R of the workpiece 23. If the eccentricity e is ⅔ of the nominal radius R, this error in the value of distance l will exceed 10%. Accordingly, the present embodiment corrects for this effect by obtaining a value for the length n, which is used as an estimate for the value of the length m. As shown in FIG. 9, the distance n is the distance parallel to m but extending from the same point on the actual surface of the workpiece 49 as the distance l. The distance n is obtained by dividing l by cos (θ−α) as set out in Equation 18.

$$n = \frac{l}{\cos(\theta - \alpha)} \quad (18)$$

Figure 10:
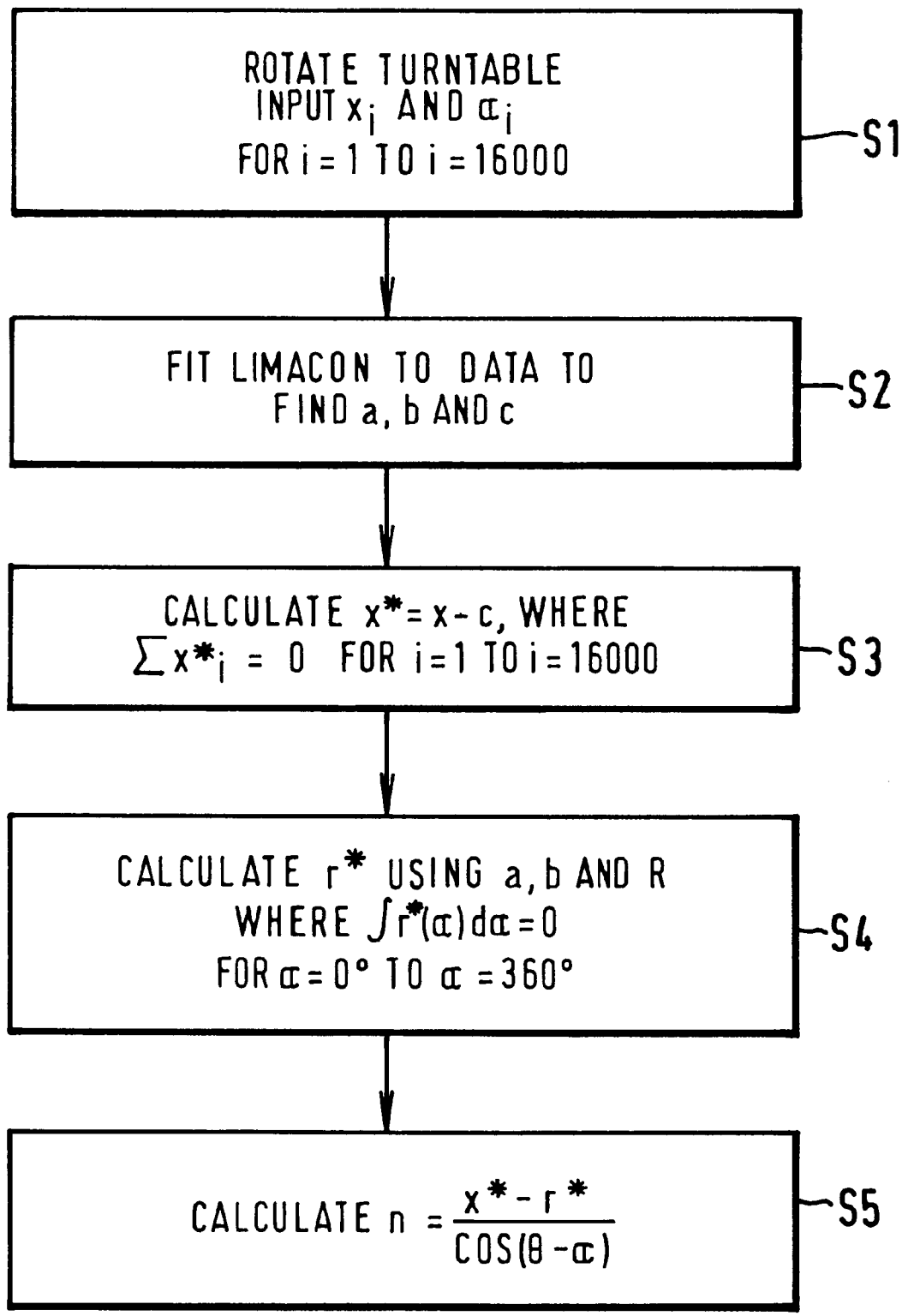
FIG. 10 is a flow diagram of the data re-centring routine.

FIG. 10 is a flow diagram for the procedure to obtain values for n from the data obtained while rotating the turntable 7. As previously mentioned, data is obtained for 16,000 data points, and a value for the $i^{th}$ data point is indicated by marking the symbol for that value with the subscript i.

In step S1 the turntable 7 is rotated through 360° and the processor 29 obtains values for x and α for each of the 16,000 points.

In step S2, the limacon formula of Equation 9 is fitted to the input data to find the values for a, b and c.

In step S3 the modified data values x* are obtained according to Equation 14.

In step S4 the comparison data r* is calculated using Equation 16 with the values for a and b obtained in step S2 and the value for R as entered in advance by the operator in accordance with the workpiece being measured.

In step S5 n is calculated according to Equation 13 and Equation 18.

Although FIG. 10 illustrates the principle of the steps used, the calculations in practice do not follow the order of FIG. 10 exactly. After steps S1 and S2 have been carried out using all of the input data points, the procedure for calculating n according to steps S3 to S5 is carried out separately in turn for each data point, as the value for n for that data point is required by the next processing operation (which is a filtering and retiming operation as is discussed later). Additionally, the calculations-performed do not follow steps S3 to S5 exactly, but instead a series of steps is carried out having equivalent mathematical effect to provide the value for n. In practice, there are many different sets of mathematical steps which will all have the same equivalent effect of calculating n according to the equations set out above, and the particular series chosen is a matter of convenience in the programming of the processor 29.

As mentioned above, the present embodiment logs values for the distance x at 16,000 points around the circumference of the workpiece 23. For subsequent analysis, these 16,000 data points are low pass filtered and reduced in number to 2,000 data points. This is done using a convolution of numerical filters which approximates to a Gaussian 500 undulations-per-revolution low pass filter. At the time of reducing the number of data points, the filtering stage also re-spaces the data points so that, after filtering, the data points are equally spaced with respect to the angle $\theta$ about the centre W of the cross-section through the workpiece 23, whereas the values for measurements x and corrected measurements n are obtained for points which are equally spaced with respect to the angle $\alpha$ about the axis S of rotation of the turntable 7.

The present embodiment uses a three-stage filtering procedure. The first filtering stage is a triangular filter having relative coefficients [1, 2, 3, 4, 3, 2, 1]. This is also a data reduction filter, reducing the number of data points from 16,000 to 4,000. The second filter stage filters these 4,000 points using the relative coefficients [1, 6, 15, 20, 15, 6, 1]. This can be implemented as a convolution of three triangular filters, each having relative coefficients [1, 2, 1]. Finally, the third filtering stage is another triangular filter having relative coefficients [1, 2, 1], which also reduces the number of data points from 4,000 down to 2,000.

The first filtering stage is provided as a convolution of two box filters, each having relative filtering coefficients [1, 1, 1, 1]. The first of these box filters is used to re-space the data points so that they are evenly spaced with respect to $\theta$. The respacing operation is conducted in a box filter, because the effect of a box filter is equivalent to integrating the input data over the range of the filter, and integrating with a variable length of filter is a conveniently simple way of respacing the data. The manner in which this box filter operates will now be discussed with reference to FIGS. 11 and 12.

If the box filter was performing simple filtering without respacing the data points around the surface of the workpiece 23, each output value data would be the average of four successive input values n (in accordance with the relative values of the coefficients of the filter), i.e. it would use data values corresponding to four successive values of $\alpha$. For the next output value data, the first input data value n would be discarded, the second to fourth input data values in the filter would become the first to third input data values in the filter, and the next input data value n would provide the fourth input data value in the filter, i.e. the position of the filter's input "box" would move by one value of $\alpha$.

In order to respace the data points, this procedure is modified as illustrated in FIGS. 11 and 12. As shown in the Figures, each output value data corresponds to four theoretical values for $\theta$, (i.e. the length of the filter's input "box" is four values of $\theta$, instead of four values of $\alpha$) assuming that $\theta$ has 16,000 equally spaced values, and the input data is integrated over this range of values for $\theta$. For successive output values data, the position of the filter's input "box" moves by one value of $\theta$ instead of one value of $\alpha$. In practice, the value of $\theta$ for the ends of the input "box" (i.e. the integration interval) for each successive data point is calculated. These values of $\theta$ are represented in FIGS. 11 and 12 by the broken vertical lines defining the range shown in the drawing for each output value data. Then the corresponding values for $\alpha$ are calculated from these boundary values for $\theta$, in accordance with Equation 5. Each value for n is treated as being the measured error in the workpiece radius over a range of angles $\alpha$ centred on the angle $\alpha$ at which the corresponding measurement x was logged, so that there is a value for n at every possible value of $\alpha$.

As is shown in FIGS. 11 and 12, the ends of the integration interval for each output data point will normally be offset between the boundaries between the ranges of angle $\alpha$ covered by each value n. Where this happens, the contribution of a value n to an output value data is scaled down in accordance with the proportion of its range of $\alpha$ which falls within the desired range of $\theta$ for the output data point in consideration. Where the whole of the range of $\alpha$ for a value of n falls within the integration interval for an output data point, that value of n is not scaled. Accordingly, as shown in FIG. 11, the value of n, is scaled by the factor 0.8 and the value of $n_{i+5}$ is scaled by the factor 0.4, but the values for $n_{i+1}$, $n_{i+2}$, $n_{i+3}$ and $n_{i+4}$ are used without being scaled down in the calculation of output value data$_k$.

FIG. 11 represents the respacing operation of the filter for points around the surface of the workpiece near the bottom left in FIG. 8, where the surface of the workpiece is relatively close to the spindle axis S, so that the surface moves past the tip of the stylus 27 relatively slowly and points at equal angles $\alpha$ about the spindle axis S represent points closer together on the surface of the workpiece than are required. FIG. 12 illustrates the operation of the filter for data points taken from a part of the surface of the workpiece at the top right in FIG. 8, where the surface of the workpiece is at a relatively great distance from the spindle axis S, so that the surface moves past the tip of the stylus 27 relatively quickly and points at equal angles $\alpha$ around the spindle axis S are spaced further apart on the surface of the workpiece than is desired.

In the operation of the data re-spacing box filter described with reference to FIGS. 11 and 12, there is a slight inaccuracy in that it is assumed for the purposes of calculating each output data value that the input data values n which contribute to the output data value are at equal spacings with respect to the angle $\theta$. In practice, the amount of inequality in spacing with respect to the angle $\theta$ within the integration interval for each output data point is negligible provided that the eccentricity e does not exceed $\tfrac{2}{3}$ of the nominal radius R of the workpiece 23.

The variation in speed of the surface of the workpiece 23 past the tip of the stylus 27 means that at some angles $\theta$ less than 4 points should contribute to each output data value from the data respacing filter. However, even if the spindle axis S is in line with the ideal surface of the workpiece 23, i.e. the eccentricity e equals the nominal radius R, the maximum velocity of surface of the workpiece past the tip of the stylus 27 is only twice what the velocity would be if the spindle axis S was in line with the centre W of the cross-section through the workpiece. In this extreme case, where e equals R, there will always be at least two input values n to contribute to each output data value in the respacing filter. Accordingly, since it is recommended that the eccentricity e does not exceed $\tfrac{2}{3}$ of the nominal radius R, it is clear that there will always be sufficient input data points for the respacing filter to operate satisfactorily.

After the respacing of the data points by the first box filter of the first filter portion, the data points subsequently processed in the processor 29 can be treated as being at equal angles θ around the centre W of the measured cross-section through the workpiece 23. Accordingly, the remainder of the filtering and the subsequent analysis algorithms can operate in a conventional manner.

The second box filter of the first filtering stage reduces the number of respaced data points around the surface of the workpiece 23 from 16,000 to 4,000 at the output of the first filtering stage. Each output value of the second box filter is the average of four successive respaced input values (in accordance with the relative values of the coefficients of the filter), and in order to reduce the number of data points all four data points used for calculating one output value are discarded after that output value has been calculated, and the next four respaced input data values are used to calculate the next output data value, thereby reducing the number of data values by a factor of four.

As mentioned above, the 4,000 filtered data points are subsequently reduced to 2,000 data points in the third filtering stage.

The function for calculating the value of α for a desired value of θ according to Equation 5, and the functions used for calculating n, especially the function of Equation 10 or the function of Equation 16, require large amounts of calculation. Accordingly, it will take the processor 29 a significant time to calculate these values for all of the input data. In an alternative embodiment, the amount of calculation required is reduced by calculating these values only for some points around the workpiece 23, and using numeral interpolation to obtain values at points between those where the values are calculated.

The numerical interpolation is carried out by fitting a cubic polynomial to the function which is being interpolated. Each interpolation interval extends between two points for which the value of the interpolated function is calculated and also the derivative of the interpolated function is calculated and these four calculated values are input as constants in the cubic polynomial interpolation function. The interpolation function is set out in Equation 19, using the following terminology.

p is the position of an intermediate point in the interpolation interval, at which the function value is being interpolated, and p=0 at the beginning of the interval and p=1 at the end of the interval.

Func(p) is the value of the cubic polynomial interpolation function at point p.

w is the width of the interpolation interval.

B is the calculated value of the function being interpolated at the beginning of the interpolation interval.

B' is the derivative of the function being interpolated at the beginning of the interpolation interval.

E is the value of the function being interpolated at the end of the interpolation interval.

E' is the derivative of the function being interpolated at the end of the interpolation interval.

$$Func(p) = B(3p^2 - 2p^3) + B'w(p^3 - p^2) + \\ E(1 + 2p^3 - 3p^2) + \\ E'w(p - 2p^2 + p^3) \quad (19)$$

The distance around the circumference of the workpiece is divided into 160 interpolation intervals, so that each interpolation interval covers 100 values of n or 100 values of θ. Because the interpolation function Func(p) is in polynomial form, it can be calculated much more quickly than the functions of Equation 5 and Equation 10 or Equation 16, and therefore this greatly reduces the calculation time required. The errors introduced by this numerical interpolation method are small compared with the effects of some of the other approximations used in the first embodiment, and accordingly it does not significantly reduce the accuracy of the output data.

Numerical approximation methods using cubic polynomials and other interpolation functions are well known to those skilled in the art, and the interpolation function given in Equation 19 is only one example of a suitable interpolation function.

As explained above, the ability of the present embodiments to provide accurate compensation for eccentricities up to ⅔ of the nominal radius of the component, provided that the variations in measured position do not exceed the range of the measuring probe, means that centring a workpiece 23 on the turntable 7 by eye or by using a jig will be sufficiently accurate to allow a roundness measurement to be carried out. This makes the embodiments quick and convenient to use.

The present embodiments have been described by way of example, and various modifications and alternatives will be apparent to those skilled in the art.

I claim:

1. An instrument for measuring the roundness of a workpiece cross-section, said workpiece cross-section having a center and a perimeter defining a shape, said instrument comprising:

a turntable for mounting a workpiece, said turntable being rotatable about an axis of rotation;

a holder for holding a measuring probe, the measuring probe being operable to provide a signal representative of the shape of the workpiece cross-section as the turntable rotates about the axis of rotation; and a processor for receiving and processing data derived from said signal, said data representing a plurality workpiece surface points which are located on the perimeter of said workpiece cross-section at respective different ones of a plurality of known angles around the axis of rotation determined in relation to a reference line radiating from the axis of rotation;

wherein said processor is operable to process said data to:
(i) estimate a position of the center of the workpiece cross-section relative to the axis of rotation; and
(ii) calculate, from said data and said estimated position, a measure of the distance between the centre of the workpiece cross-section and the perimeter of the workpiece cross-section at a plurality of known angles around the centre of the workpiece cross-section.

2. An instrument according to claim 1, wherein said processor is arranged to calculate each of said measures by applying a box filter having a variable integration interval to said data representing the plurality of workpiece surface points, wherein said variable integration interval of the box filter is arranged to vary for each of said measures dependent upon the estimated position of the center of the workpiece.

3. An instrument for measuring the roundness of a workpiece cross-section, said workpiece cross-section having a center and a perimeter defining a shape, said instrument comprising:

a turntable for mounting a workpiece, said turntable being rotatable about an axis of rotation;

a holder for holding a measuring probe, the measuring probe being operable to provide a signal representative of the shape of the workpiece cross-section as the turntable rotates about the axis of rotation; and a processor for receiving and processing data derived from said signal, said data comprising a set of distances, each of said distances being representative of the distance between a point on the perimeter of the workpiece cross-section and a circle centered on the axis of rotation along a respective different one of a plurality of lines radiating from the axis of rotation, each of said plurality of lines being at a respective different one of a plurality of known angles determined in relation to a reference line radiating from the axis of rotation, wherein said processor is operable to process said data to:
(i) estimate a position of the center of the workpiece cross-section relative to the axis of rotation by fitting a reference shape to said data;
(ii) calculate a measure of the distance between the perimeter of the workpiece cross-section and said reference shape along each of said plurality of lines; and
(iii) adjust, using the estimated position, each of said measures to at least partially compensate for the difference in measuring said measure in a direction towards the axis of rotation as compared with measuring said measure in a direction towards the centre of the workpiece cross-section.

4. An instrument according to claim 3, wherein said processor is arranged to divide each of said measures by a respective value, said respective value being $\cos(\theta-\alpha)$, where $\alpha$ is the angle between the respective one of said plurality of lines and the reference line, and $\theta$ is the angle between a line radiating from the estimated position of the center of the workpiece cross-section parallel to the reference line and a line radiating from the estimated position of the center of the workpiece cross-section to a point on the reference shape at which said respective one of said plurality of lines intersects said reference shape.

5. An instrument according to claim 3, wherein the reference shape is defined by a function having the form $c+a \cos(\alpha)+b \sin(\alpha i)$, where $\alpha$ is the angle between a respective one of said plurality of lines and the reference line, a is a first constant corresponding to the component of the estimated position of the centre of workpiece cross-section relative to the axis of rotation in the direction corresponding to $\alpha=0°$, b is a second constant corresponding to the component of the estimated position of the center of the workpiece cross-section relative to the axis of rotation in the direction corresponding to $\alpha=90°$, and c is a third constant.

6. An instrument for measuring the roundness of a workpiece cross-section, said workpiece cross-section having a center and a perimeter defining a shape, said instrument comprising:

a turntable for mounting a workpiece, said turntable being rotatable about an axis of rotation;

a holder for holding a measuring probe, the measuring probe being operable to provide a signal representative of the shape of the workpiece cross-section as the turntable rotates about the axis of rotation; and a processor for receiving and processing data derived from said signal, said data comprising a set of first distances, each of said first distances being representative of the distance between a point on the perimeter of the workpiece cross-section and a circle centered on the axis of rotation along a respective different one of a plurality of lines radiating from the axis of rotation, each of said plurality of lines being at a respective different one of a plurality of known angles determined in relation to a reference line radiating from the axis of rotation, wherein said processor is operable to process said data to:
(i) estimate an eccentricity of the workpiece relative to the axis of rotation by fitting a first function having the form $c+a \cos(\alpha)+b \sin(\alpha)$ to said set of first distances, where $\alpha$ is the angle between a respective one of said plurality of lines and the reference line, a is a first constant corresponding to an estimate of the component of the eccentricity in the direction corresponding to $\alpha=0°$, b is a second constant corresponding to an estimate of the component of the eccentricity in the direction corresponding to $\alpha=90°$, and c is a third constant;

(ii) calculate a set of second distances by subtracting a fourth constant from each of said set of first distances, said fourth constant being such that a sum of the set of second distances around the axis of rotation equals zero; and (iii) subtract from each value of the set of second distances a second function, said second function integrating to zero over $\alpha=0°$ to $\alpha=360°$ and differing from a $\cos(\alpha)+b \sin(\alpha)$ by a first correction term and a second correction term, where the first correction term has a magnitude which varies with $\alpha$ and represents at least approximately the difference between said first function and an equation for an eccentric circle, and the second correction term has a magnitude which does not vary with $\alpha$ and represents at least approximately the magnitude of the integral of the first correction term over $\alpha=0°$ to $\alpha=360°$.

7. An instrument for measuring the roundness of a workpiece cross-section, said workpiece cross-section having a center and a perimeter defining a shape, said instrument comprising; a turntable for mounting a workpiece, said turntable being rotatable about an axis of rotation;

a holder for holding a measuring probe, the measuring probe being operable to provide a signal representative of a shape of the workpiece cross-section as the turntable rotates about the axis of rotation; and a processor for receiving and processing data derived from said signal, said data comprising a set of first distances, each of said first distances being representative of the distance between a point on the perimeter of the workpiece cross-section and a circle centered on the axis of rotation along a respective different one of a plurality of lines radiating from the axis of rotation, each of said plurality of lines being at a respective different one of a plurality of known angles determined in relation to a reference line radiating from the axis of rotation, wherein said processor is operable to process said data to:
(i) estimate a position of the center of the workpiece cross-section relative to the axis of rotation, thereby providing an estimate of an eccentricity of the workpiece cross-section, by fitting a first function having the form c+a cos (α)+b sin (α) to said set of first distances, where α is the angle between a respective one of said plurality of lines and the reference line, a is a first constant corresponding to an estimate of the component of the eccentricity in the direction corresponding to α=0°, b is a second constant corresponding to an estimate of the component of the eccentricity in the direction corresponding to α=90°, and c is a third constant;

(ii) calculate a set of second distances by subtracting a fourth constant from each of the set of first distances, said fourth constant being such that a sum of the set of second distances around the axis of rotation equals zero;

(iii) calculate a set of third distances by subtracting from each of the set of second distances a second function, said second function integrating to zero over α=0° to α=360° and differing from a cos (α)+b sin (α) by a first correction term and a second correction term, where the first correction term has a magnitude which varies with α and represents at least approximately the difference between said first function and an equation for an eccentric circle, and the second correction term has a magnitude which does not vary with α and represents at least approximately the magnitude of the integral of the first correction term over α=0° to α=360°;

(iv) adjust each of the set of third distances to at least partially compensate for the difference in measuring said set of third distances in a direction towards the axis of rotation and measuring said set of third distances in a direction towards the center of the workpiece cross-section; and (v) use said set of third distances and the estimated position of the center of the workpiece cross-section to obtain a measure of the distance between the center of the workpiece cross-section and the perimeter of the workpiece cross-section at a plurality of known angles around the center of the workpiece cross-section.

8. An instrument according to any of claims 1 to 7, wherein the instrument further comprises a centering unit and a leveling unit to enable approximate manual alignment of the workpiece.

9. An instrument according to any of claims 1 to 8, wherein the instrument further comprises means for mounting a jig adapted to hold the workpiece.

10. A computer useable medium having computer readable instructions stored therein for causing the computer to process data derived from a signal received from a measuring probe as the measuring probe follows a perimeter of a workpiece cross-section as a turntable on which a workpiece is mounted rotates about an axis of rotation, the instructions comprising instructions for causing the computer to process said data to:

(i) estimate a position of the center of the workpiece cross-section relative to the axis of rotation; and (ii) calculate, from said data and said estimated position, a measure of the distance between the centre of the workpiece cross-section and the perimeter of the workpiece cross-section at a plurality of known angles around the centre of the workpiece cross-section.

11. A computer useable medium having computer readable instructions stored therein for causing the computer to process data derived from a signal received from a measuring probe as the measuring probe follows a perimeter of a workpiece cross-section as a turntable on which a workpiece is mounted rotates about an axis of rotation, said data being a set of distances with each of said distances being representative of the distance between a point on the perimeter of the workpiece cross-section and a circle centered on the axis of rotation along a respective different one of a plurality of lines radiating from the axis of rotation, each of said plurality of lines being at a respective different one of a plurality of known angles determined in relation to a reference line radiating from the axis of rotation, the instructions comprising instructions for causing the computer to process said data to:

(i) estimate a position of the center of the workpiece cross-section relative to the axis of rotation by fitting a reference shape to said data;

(ii) calculate a measure of the distance between the perimeter of the workpiece cross-section and said reference shape along each of said plurality of lines; and (iii) adjust, using the estimated position, each of said measures to at least partially compensate for the difference in measuring said measure in a direction towards the axis of rotation as compared with measuring said measure in a direction towards the centre of the workpiece cross-section.

12. A computer useable medium having computer readable instructions stored therein for causing the computer to process data derived from a signal received from a measuring probe as the measuring probe follows a perimeter of a workpiece cross-section as a turntable on which a workpiece is mounted rotates about an axis of rotation, said data comprising a set of first distances with each of said first distances being representative of the distance between a point on the perimeter of the workpiece cross-section and a circle centered on the axis of rotation along a respective different one of a plurality of lines radiating from the axis of rotation, each of said plurality of lines being at a respective plurality of known angles determined in relation to a reference line radiating from the axis of rotation, the instructions comprising instructions for causing the computer to process said data to:

(i) estimate an eccentricity of the workpiece relative to the axis of rotation by fitting a first function having the form c+a cos (α)+b sin (α) to said set of first distances, where α is the angle between a respective one of said plurality of lines and the reference line, a is a first constant corresponding to an estimate of the component of the eccentricity in the direction corresponding to α=0°, b is a second constant corresponding to an estimate of the component of the eccentricity in the direction corresponding to α=90°, and c is a third constant;

(ii) calculate a set of second distances by subtracting a fourth constant from each of said set of first distances, said fourth constant being such that a sum of the set of second distances around the axis of rotation equals zero; and (iii) subtract from each value of the set of second distances a second function, said second function integrating to zero over α=0° to α=360° and differing from a cos (α)+b sin (α) by a first correction term and a second correction term, where the first correction term has a magnitude which varies with α and represents at least approximately the difference between said first function and an equation for an eccentric circle, and the second correction term has a magnitude which does not vary with α and represents at least approximately the magnitude of the integral of the first correction term over α=° to α=360°.

13. A computer useable medium having computer readable instructions stored therein for causing the computer to process data derived from a signal received from a measuring probe as the measuring probe follows a perimeter of a workpiece cross-section as a turntable on which a workpiece is mounted rotates about an axis of rotation, said data comprising a set of first distances with each of said first distances being representative of the distance between a point on the perimeter of the workpiece cross-section and a circle centered on the axis of rotation along a respective different one of a plurality of lines radiating from the axis of rotation, each of said plurality of lines being at a respective different one of a plurality of known angles in relation to a reference line radiating from the axis of rotation, the instructions comprising instructions for causing the computer to process said data to:
  (i) estimate a position of the center of the workpiece cross-section relative to the axis of rotation, thereby providing an estimate of an eccentricity of the workpiece cross-section, by fitting a first function having the form c+a cos (α)+b sin (α) to said set of first distances, where
    α is the angle between a respective one of said plurality of lines and the reference line,
    a is a first constant corresponding to an estimate of the component of the eccentricity in the direction corresponding to α=0°,
    b is a second constant corresponding to an estimate of the component of the eccentricity in the direction corresponding to α=90°, and
    c is a third constant;
  (ii) calculate a set of second distances by subtracting a fourth constant from each of the set of first distances, said fourth constant being such that a sum of the set of second distances around the axis of rotation equals zero;
  (iii) calculate a set of third distances by subtracting from each of the set of second distances a second function, said second function integrating to zero over α=0° to α=360° and differing from a cos (α)+b sin (α) by a first correction term and a second correction term, where the first correction term has a magnitude which varies with α and represents at least approximately the difference between said first function and an equation for an eccentric circle, and the second correction term has a magnitude which does not vary with α and represents at least approximately the magnitude of the integral of the first correction term over α=0° to α=360°;

(iv) adjust each of the set of third distances to at least partially compensate for the difference in measuring said set of third distances in a direction towards the axis of rotation and measuring said set of third distances in a direction towards the center of the workpiece cross-section; and
  (v) use said set of third distances and the estimated position of the center of the workpiece cross-section to obtain a measure of the distance between the centre of the workpiece cross-section and the perimeter of the workpiece defining the shape of the workpiece cross-section at a plurality of known angles around the center of the workpiece cross-section.

\* \* \* \* \*

UNITED STATES PATENT AND TRADEMARK OFFICE
CERTIFICATE OF CORRECTION

PATENT NO. : 5,926,781
DATED : July 20, 1999
INVENTOR(S) : Scott

It is certified that error appears in the above-identified patent and that said Letters Patent is hereby corrected as shown below:

Column 12, line 3, "2ercos" should read --2er cos--.

Column 12, line 7, "2ercos" should read --2er cos--.

Throughout the specification, "asin" should read --a sin--.

Throughout the specification, "acos" should read --a cos--.

Throughout the specification "bcos" should read --b cos--.

Throughout the specificaiton, "bsin" should read --b sin--.

Column 15, line 5, after "calculations" delete -- - --.

Column 16, line 23, "n," should read --$n_i$--.

Column 19, line 45, "($\alpha$i)" should read --($\alpha$)--.

Column 21, line 50, "8" should read --7--.

Signed and Sealed this

Fourteenth Day of December, 1999

Attest:

Attesting Officer

Q. TODD DICKINSON

Acting Commissioner of Patents and Trademarks